Patented June 2, 1931

1,807,810

UNITED STATES PATENT OFFICE

JOHN A. RICE, OF BERKELEY, CALIFORNIA, ASSIGNOR TO THE BUBBLESTONE COMPANY, OF PITTSBURGH, PENNSYLVANIA, A CORPORATION OF PENNSYLVANIA

PROCESS FOR MAKING A FOAMY BODY

No Drawing.  Application filed July 26, 1924. Serial No. 728,279.

The present invention relates to special foam-producing compositions, suitable for use in making cellular concrete or the like, in accordance with the process of my co-pending application, Serial No. 608,349, filed December 21, 1922, which process, briefly stated, comprises as its essential step, incorporating resistant foam with cement and water.

While, as stated in said prior case, a solution of glue containing a small amount of formaldehyde can be used for producing the foam (e. g. by beating or whipping), it is possible to produce a better, stronger and more persistent foam, by the use of the formulas given herein.

The following are given as examples of such materials:

*Example 1.*—To 1000 volumes of 2% glue solution is added 4 volumes of a formaldehyde solution of about 40% strength.

Separately therefrom a solution of rosin, alcohol and formalin is made as follows:

(a) 100 parts (by weight) of rosin is dissolved in
335 parts of alcohol and
18 parts of formalin (40% formaldehyde) is added;

or—

(b) 20 parts of rosin is dissolved in
50 parts of acetone, and
34 parts of formalin is added.

To 100 parts (by volume) of the glue formaldehyde solution, about 6 parts of (a) or (b) should be added. The rosin solution (a) or (b) should be added while violently agitating the glue solution so that immediate dispersion or dilution of the rosin solution is assured. This mixture is then beaten to produce a foamy body. In this example, the proportions are merely illustrative and can be varied through a wide range. In place of rosin, copal, shellac, or soluble phenol formaldehyde, resin, rubber, celluloid, cellulose acetate can be used, many of which render the foam far more resistant and stable.

*Example 2.*—One part of common rosin in the form of fine powder is mixed with 16 parts of water. While being agitated, enough ammonia water or other alkali is added to dissolve the rosin. This solution may be added to the glue formadehyde solution as above described, about one part of the rosin solution to 15 or 20 parts of the glue solution being very suitable.

In both of the above examples, the strength of the glue solution can be varied. While a 2% solution of glue is here referred to, various concentrations from 0.1% to 10% (more or less) can be used. Other materials besides glue can be substituted, such as gelatin, casein, albumen, (e. g., blood albumen or egg white). Solutions of various soluble adhesive materials such as dextrin, molasses, glucose, syrup, gum tragacanth, starch (boiled in water solution), also can be substituted in place of the glue solution.

In place of beating or whipping to produce foam, this can be produced by the introduction into the liquid of numerous fine air jets, or jets of other gases, or by other known methods.

*Example 3.*—A solution of cellulose derivative such as cellulose acetate in acetone or other solvent, is added to a solution of casein in alkali, say, one pound of 6% solution of cellulose acetate in acetone is added to a solution of 4 pounds of casein in 1000 pounds of water (containing sufficient alkali, such as ammonia, to dissolve the casein). This solution is converted into a foam directly or after adding about 4/1000 pounds (or 2/3 ounce of formalin, 40%).

As in my copending case, soap bark, common soap, rosin soap or equivalent, can be added to this to make it foam more strongly. Upon drying, the foam is resistant, bearing minute cell-shaped bubbles having paper-like coverings.

In the above example, the strength of the casein solution or the cellulose acetate solution or the formalin solution can be varied within comparatively wide limits, producing a tenaceous foam.

*Example 4.*—To 400 parts (by weight) of 2% glue solution (in water) or 400 parts of 1% casein solution (in alkali and water), is added 1 part of very thick viscose.

This solution may be converted into foam alone, or preferably upon adding rosin soap, soap or soap root, etc. Formalin can also be added if desired.

*Example 5.*—To the solution as given in Example 4, or to a plain solution of viscose containing about 2/100 of 1% cellulose, is added 40 parts of rosin solution, made as follows:

Take 60 parts of water
1 part powdered rosin while stirring add sufficient ammonia water to dissolve the rosin. Then add sufficient weak solution (say 5%) of aluminum chloride, aluminum sulphate, a ferric salt, or an acid (such as sulphuric acid or hydrochloride acid), or other soluble precipitant, to precipitate about 4/5 to 9/10 (more or less) of the rosin, either as resinate or as a fine precipitate of rosin acids. The fine precipitate tends to produce a stable and tenaceous foam, and the precipitating substances improve the setting of Portland cement by preventing or greatly retarding chemical action between the cement itself and the soluble resinates.

*Example 6.*—Mix 4 parts of starch with 100 parts of water, heat to boiling while stirring: cool. Separately therefrom stir one part of finely powdered rosin with 30 parts of water and add enough ammonia water to dissolve the rosin (optionally partially neutralizing with alum or equivalent as above stated). Mix the 2 solutions and dilute with water to five times the volume. Beat into a foam.

*Example 7.*—In the above Example 6, after dissolving the rosin in ammonia, sulphuric acid can be added to the resinate solution, to neutrality, forming a colloidal suspension of resin acids.

In the two above examples (6 and 7) sulphuric acid can be used in quantity sufficient to produce a slow reddening of litmus paper.

*Example 8.*—Make a lather from one of the above; say the glue and formaldehyde solution. To about 5 cubic feet of the lather, add say 20 cubic centimeters of a 50% solution of calcium chlorid ($CaCl_2$). This mixture is then incorporated with the cement grout.

In all of the examples where a soap (e. g. resinate) or a solution of a resinous body (e. g., shellac, rosin, etc. in alcohol or other solvent), or other foam assistant body is used, the amount of that constituent will be sufficient to greatly lower the surface tension of the liquid whereby its ease of foaming will be increased.

I claim:

1. The process of producing a foam for cellular concrete which comprises mixing a foaming agent with a stabilizing colloidal solution of a cellulose derivative, and converting the resulting mixture into foam.

2. The process of producing a lather for cellular concrete which comprises mixing a stabilizing rosin soap with a solution of a colloidal substance to serve as a base and forming a foam therefrom.

3. The process of producing a lather for cellular concrete which comprises mixing a stabilizing rosin soap with a colloidal solution of a carbohydrate material and producing a lather therefrom.

4. The process of producing a lather for cellular concrete which comprises mixing a foaming agent and an alkali soap with a stabilizing colloidal solution of a cellulose compound and converting the mixture into a lather.

5. The process of producing a lather for cellular concrete which comprises mixing a foaming agent and a rosin soap with a stabilizing colloidal solution of a cellulose compound and the agitating of the mixture to produce a lather.

6. A base for a lather adapted to be used in the manufacture of cellular concrete consisting of a foaming agent and a stabilizing colloidal solution of a cellulose derivative.

In witness whereof, I have hereunto set my hand at Ottawa, Province of Ontario, Canada this 14th day of June, A. D. nineteen hundred and twenty-four.

JOHN A. RICE.